United States Patent
Kuo et al.

(10) Patent No.: US 6,753,043 B1
(45) Date of Patent: Jun. 22, 2004

(54) PATTERNING OF HIGH COERCIVITY MAGNETIC MEDIA BY ION IMPLANTATION

(75) Inventors: David S. Kuo, Palo Alto, CA (US); Xinwei Li, Milpitas, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 184 days.

(21) Appl. No.: 09/974,909

(22) Filed: Oct. 12, 2001

Related U.S. Application Data (60) Provisional application No. 60/254,220, filed on Dec. 7, 2000.

(51) Int. Cl.$^7$ .............................................. C23C 14/04
(52) U.S. Cl. ....................... 427/526; 427/128; 427/129; 427/130; 427/131; 427/132; 427/255.4; 427/256; 427/282; 427/331; 427/399; 427/533; 427/548; 427/599
(58) Field of Search ................................ 427/128, 129, 427/130, 131, 132, 255.4, 256, 282, 331, 399, 526, 533, 548, 599

(56) References Cited

U.S. PATENT DOCUMENTS

| | | |
|---|---|---|
| 4,556,597 A | 12/1985 | Best et al. |
| 4,684,547 A | 8/1987 | DiStefano et al. |
| 4,935,278 A | 6/1990 | Krounbi et al. |
| 5,083,226 A | 1/1992 | Shiiki et al. |
| 5,723,033 A | 3/1998 | Weiss |
| 5,858,474 A | 1/1999 | Meyer et al. |
| 5,991,104 A | 11/1999 | Bonyhard |
| 6,055,139 A | 4/2000 | Ohtsuka et al. |
| 6,086,961 A | 7/2000 | Bonyhard |
| 6,153,281 A | 11/2000 | Meyer et al. |
| 6,156,422 A | 12/2000 | Wu et al. |

Primary Examiner—Bernard Pianalto
(74) Attorney, Agent, or Firm—McDermott, Will & Emery

(57) ABSTRACT

A servo-patterned magnetic recording medium, comprising:
  a magnetic layer having a surface with substantially uniform topography, the magnetic layer including a data zone and a servo pattern, the servo pattern comprising:
  (a) a first patterned plurality of regions of first, higher values of magnetic coercivity $H_c$ and magnetic remanence-thickness product Mrt; and
  (b) a second patterned plurality of ion-implanted regions of second, lower values of $H_c$ and Mrt; wherein the second, lower values of $H_c$ and Mrt are sufficiently lower than the first, higher values of $H_c$ and Mrt as to permit sensing for enabling accurate positioning of a read/write transducer head in the data zone but sufficiently high for providing the medium with thermal stability, high amplitude of magnetic transition, and high signal-to-noise ratio.

11 Claims, 4 Drawing Sheets

PATTERNING OF HIGH COERCIVITY MAGNETIC MEDIA BY ION IMPLANTATION

CROSS-REFERENCE TO PROVISIONAL APPLICATION

This application claims priority from U.S. provisional patent application Serial No. 60/254,220 filed Dec. 7, 2000, the entire disclosure of which is incorporated herein by reference.

CROSS-REFERENCE TO RELATED APPLICATION

This application discloses subject matter similar to subject matter disclosed in U.S. patent application Ser. No. 09/912,065, filed on Jul. 25, 2001.

FIELD OF THE INVENTION

The present invention relates to thermally stable, high coercivity, high area density, patterned magnetic recording media, and to a method for manufacturing same. The invention has particular applicability in the fabrication of thermally stable, high areal density media with integrally formed servo patterns.

BACKGROUND OF THE INVENTION

Figure 1:
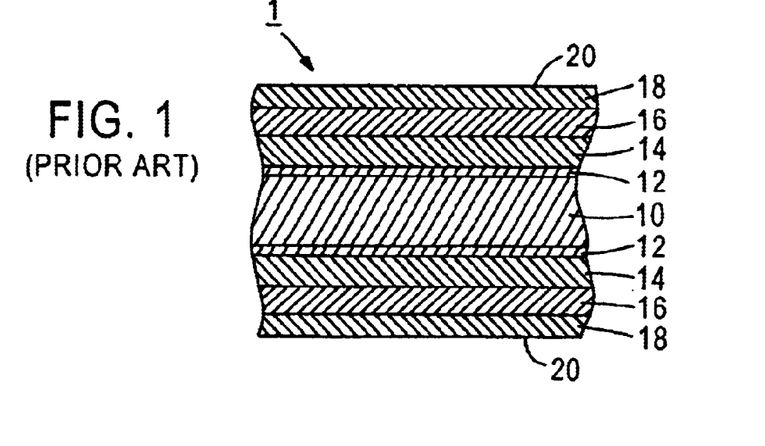
FIG. 1 is a simplified, schematic cross-sectional view, of a portion of a dual-sided, thin-film magnetic disk medium of the type contemplated herein.

Thin film magnetic recording media, e.g., in hard disk form, are conventionally employed for storing large amounts of data/information in magnetizable form. Referring now to FIG. 1, shown therein, in simplified, schematic cross-sectional view, is a portion of a dual-sided, thin-film magnetic disk medium 1 of the type contemplated by the present invention, comprising a substantially rigid, non-magnetic substrate 10, typically comprised of an aluminum (Al) alloy, e.g., Al—Mg. Alternative materials for use as substrate 10 include glass, ceramics, glass-ceramics composites and laminates, polymers, and other non-magnetic metals and alloys. Al-based substrate 10 is provided, in sequence, at both major surfaces, with a polished and/or textured amorphous Ni-P underlayer 12, a polycrystalline seed layer 14, typically a Cr-based layer deposited by sputtering, a magnetic layer 16 comprised of a ferromagnetic material, e.g., an oxide or a Co-based alloy, a protective overcoat layer 18, typically of a diamond-like carbon (DLC) material, and a lubricant topcoat layer 20, e.g., of a fluorine-containing polymer.

Figure 2:
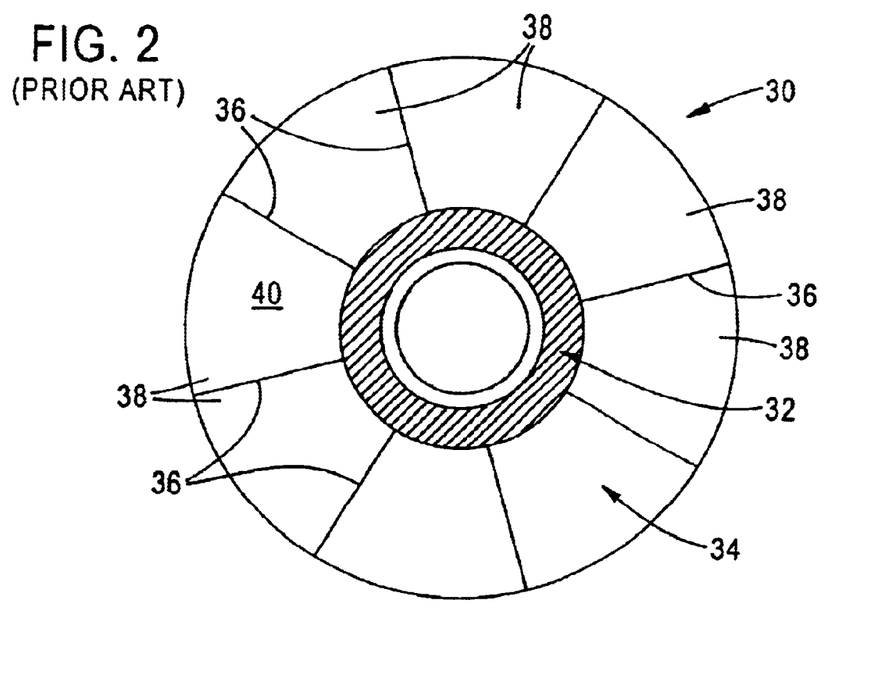
FIG. 2 is a simplified, schematic plan view, of a magnetic recording disk according to the present invention, including a data zone, servo patterning, and a contact start/stop (CSS) zone.
Figure 3A:
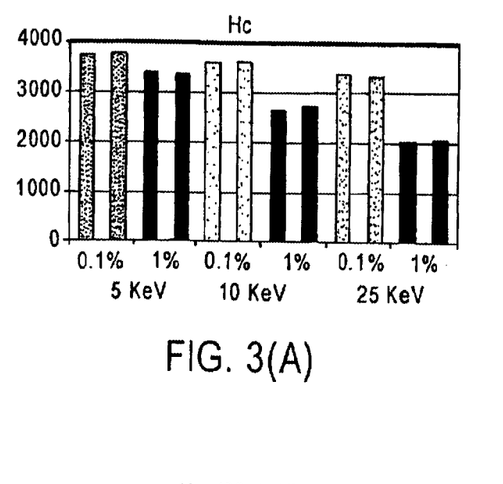
FIGS. 3(A) and 3(B) graphically illustrate the effect of nitrogen ion implantation energy and dosage on magnetic coercivity ($H_c$) and magnetic remanence-thickness product (Mrt) of a thin-film, longitudinal magnetic recording medium having initial values of $H_c$ and Mrt of about 4,000 Oe and 0.40 memu, respectively.
Figure 3B:
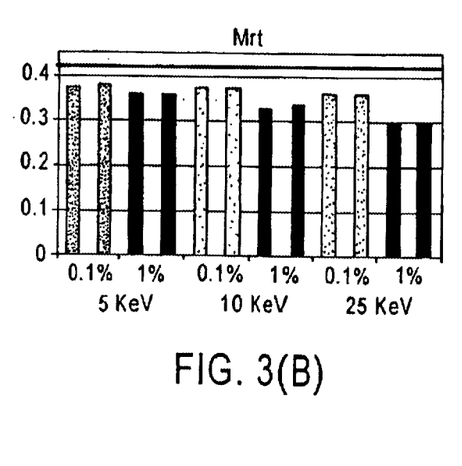
Figure 4A:
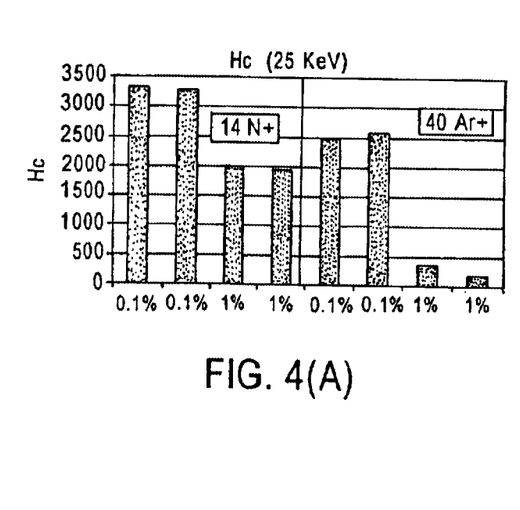
FIGS. 4(A) and 4(B) graphically compare the effects of nitrogen ion and argon ion implantation (at a fixed implantation energy of 25 KeV) on $H_c$ and Mrt of the same medium as in FIG. 3, as a function of implantation dosage.
Figure 4B:
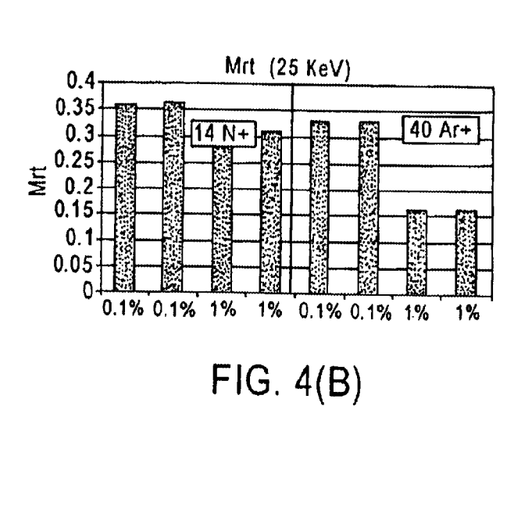

Adverting to FIG. 2, shown therein, in simplified, schematic plan view, is a magnetic recording disk 30 having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 2 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In operation of such disk-type media, a typical contact start/stop (CSS) method involves use of a floating transducer head gliding at a predetermined distance from the surface of the disk due to dynamic pressure effects caused by air flow generated between the sliding surfaces of the transducer head and the disk. During reading and recording (writing) operations, the transducer head is maintained at a controlled distance from the recording surface, supported on a bearing of air as the disk rotates, such that the transducer head can be freely moved in both the circumferential and radial directions, thereby allowing data to be recorded and retrieved from the disk at a desired position in a data zone.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

To record information on the disk, the transducer creates a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

A conventional approach to the servo-sensing problem comprises the use of mechanical voids or depressions in the magnetic layer between tracks formed by stamping or otherwise physically marking a pattern on the disk to function as servo patterns. A magnetic material layer is then applied at a constant thickness over the entire disk surface. When this type of disk is used, the distance from the magnetic head to magnetic material in the depressions is further than the distance from the magnetic head to magnetic material in the data track. The increased distance both reduces the strength of the signal from the depressions and reduces the contribution from the depressions to the magnetic field sensed by the read/write head.

While the depressions or voids formed in the disk are helpful in increasing track density, they tend to reduce the tribological performance of the disk assembly. For example, during operation of the magnetic recording medium, the slider no longer travels over a smooth surface and thus causes several mechanical performance drawbacks. These drawbacks include modulation of fly height when encountering servo patterns, fly height perturbations due to topographical changes from the track width definition, glide defects from the stamping process, and disk distortion due to the servo patterning process. Therefore, it is considered preferable to provide the servo pattern without incurring variations in surface topography.

Several approaches to forming servo-patterns are disclosed in the prior art. For example, U.S. Pat. No. 6,153,281 and U.S. Pat. No. 5,858,474, both to Meyer et al., disclose a magnetic medium having permanently defined boundaries between data tracks and a constant surface smoothness. The servo-patterns may be formed, at least in part, by a variety of techniques including, inter alia, laser ablation, laser heating, photolithography, deposition, ion milling, reverse sputtering, ion implantation, etc., which techniques and can be utilized individually or in combination, with either the magnetic layer or underlayer, to create relatively non-magnetic areas. U.S. Pat. Nos. No. 6,086,961 and U.S. Pat. No. 5,991,104, both to Bonyhard, disclose creating non-magnetic areas in the formation of servo-sensing patterns by ion implantation, where the ion implantation destroys or alters the magnetic properties of the magnetic layer.

Still other methods for forming servo-patterns are known in the prior art. For example, U.S. Pat. No. 6,055,139 to Ohtsuka et al. discloses implanting a magnetic hard disk with chromium ions to change regions of the magnetic layer into non-magnetic regions. U.S. Pat. No. 4,556,597 to Best et al. discloses providing a magnetic recording disk substrate with a capacitive servo-pattern formed by implanting dopant species into the substrate to modify the conductivity thereof. U.K. Pat. 1,443,248 to Sargunar discloses magnetic recording media and fabrication methods therefor by forming low coercivity regions therein by implantation of chromium ions. However, it is believed that the use of such metal ions adversely affects the magnetic layer.

Commonly assigned, co-pending U.S. patent application Ser. No. 09/912,065, filed Jul. 25, 2001, by the present inventors, the entire disclosure of which is incorporated herein by reference, discloses an improved method for forming servo patterns in high areal density, thin film magnetic recording media, without incurring variations or changes in media surface topography, and servo-patterned thin film magnetic recording media obtained thereby, in which nitrogen ions or heavier ions of at least one inert gas having an atomic weight of at least 35 (e.g., Ar ions) are selectively implanted (at appropriate dosages and energies) into regions of a thin film magnetic recording layer exposed through a pattern of openings in an apertured mask (e.g., in the form of a stencil or resist layer) overlying the surface of the magnetic recording layer, the pattern of openings in the apertured mask corresponding to a desired servo pattern of lower coercivity regions to be formed in the magnetic layer, whereby, for example, the coercivity ($H_c$) and magnetic remanence-thickness product (Mrt) of the ion-implanted regions can be controllably and reproducibly reduced by a desired amount. For example, implantation of argon ions at appropriate dosages and energies can reduce an initial value of $H_c$ which is as high as about 4,000 Oe, to as low as about 200 Oe and reduce an initial value of Mrt of which is as high as about 0.40, to as low as about 0.15 memu.; whereas implantation of nitrogen ions generally results in smaller reductions in $H_c$ and Mrt values.

However, when the reduction in $H_c$ and Mrt incurred by the ion-implanted regions according to the above methodology is substantial, e.g., as in the case of argon ion implantation at certain dosages and energy levels, significant concerns are raised relating to the thermal stability of the implanted media. In this regard, a fine balance must be achieved between thermal decay, signal-to-noise ratio (SNR), and writability. As a consequence, advanced magnetic media fabricated according to the above-described ion implantation methodology must have an adequate margin of thermal stability. However, because the ion-implanted regions may have substantially lower $H_c$ and Mrt values than the non-implanted regions, the former-type regions may have substantially and significantly lower thermal stability than the latter-type regions, which may, in turn, result in long-term problems such as thermal decay in signal amplitude. The substantially lower values of Mrt may also yield a lower amplitude of the magnetic transition signal, further adversely affecting SNR for the ion implantation-induced magnetic transition.

In view of the above, there exists a need for methodology and instrumentalities for performing servo patterning of thin film, high areal density, magnetic recording media, which are free of the above-stated concerns and difficulties relating to poor, or reduced, thermal stability of the ion-implanted regions constituting the servo and data track patterns of such media. Moreover, there exists a need for methods and instrumentalities for performing rapid, cost-effective servo patterning of thin film, high areal density magnetic recording media which methods and instrumentalities do not engender the above-stated concerns and are fully compatible with the requirements of automated magnetic hard disk manufacturing technology.

The present invention addresses and solves the above-described problems and disadvantages associated with ion implantation of thin film magnetic recording media for servo pattern formation therein, due to reduction in, or loss of, thermal stability and/or signal amplitude, arising from performing ion implantation for servo pattern creation, while maintaining full compatibility with all aspects of conventional automated ion implantation technology and methodology.

DISCLOSURE OF THE INVENTION

An advantage of the present invention is an improved method of making a servo-patterned magnetic recording medium.

Another advantage of the present invention is an improved method of manufacturing a servo-patterned magnetic recording medium without affecting surface topography of the medium and maintaining good thermal stability and magnetic performance characteristics.

Still another advantage of the present invention is an improved, servo-patterned magnetic recording medium.

Yet another advantage of the present invention is an improved, servo-patterned magnetic recording medium having substantially uniform surface topography while exhibiting good thermal stability and magnetic performance characteristics.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of making a servo-patterned magnetic recording medium, which method comprises the sequential steps of:

(a) providing a magnetic recording medium, the medium including a magnetic layer having preselected first, higher values of magnetic coercivity $H_c$ and magnetic remanence-thickness product Mrt;

(b) providing an apertured mask overlying a surface of the magnetic recording medium, the apertured mask including a plurality of servo pattern openings extending therethrough for selectively exposing a plurality of surface areas of the magnetic recording medium corresponding to the servo pattern;

(c) bombarding the apertured mask with ions for implanting the ions into the plurality of exposed surface areas of the magnetic recording medium for selectively reducing the first, higher values of $H_c$ and Mrt of the magnetic layer at the exposed surface areas to preselected second, lower values of $H_c$ and Mrt; wherein:

step (a) comprises providing a magnetic recording medium including a magnetic layer having sufficiently high first values of $H_c$ and Mrt such that step (c) provides each of the plurality of exposed, ion-implanted surface areas of the magnetic layer with second, lower values of $H_c$ and Mrt which are sufficiently lower than the first, higher values of $H_c$ and Mrt for functioning as servo pattern-defining areas, but sufficiently high for providing the medium with thermal stability, high amplitude of magnetic transition, and high signal-to-noise ratio (SNR).

In accordance with certain exemplary embodiments of the present invention, step (a) comprises providing a magnetic recording medium wherein the preselected first, higher values of $H_c$ and Mrt are in the range from about 6,500 to about 10,000 Oe and in the range from about 0.55 to about 0.60 memu, respectively; and step (c) comprises bombarding the apertured mask to form ion-implanted areas of the magnetic layer having preselected, second, lower values of $H_c$ and Mrt of about 6,000 Oe and about 0.50 memu, respectively.

According to other embodiments of the present invention, step (a) comprises providing a magnetic recording medium wherein the preselected first, higher values of $H_c$ and Mrt are about 6,000 Oe and 0.50 memu, respectively; and step (c) comprises forming ion implanted areas having preselected, second, lower values of $H_c$ and Mrt of about 4,000 Oe and 0.40 memu, respectively.

According to other particular embodiments of the invention, step (c) comprises bombarding the apertured mask with ions selected from the group consisting of nitrogen ions and ions of at least one rare gas element having an atomic weight of at least 35. Embodiments of the invention comprise bombarding the apertured mask with nitrogen or argon ions at a dosage of from about $1 \times 10^{10}$ to about $1 \times 10^{20}$ ions/cm$^2$ and an energy of from about 5 to about 150 KeV.

According to embodiments of the present invention, step (b) comprises providing an apertured mask including a plurality of openings for providing the magnetic layer with a data zone and a servo pattern comprising a plurality of higher $H_c$, higher Mrt regions and a plurality of lower $H_c$, lower Mrt regions, wherein the servo pattern includes a plurality of regions extending in a radial direction across the data zone to divide the latter into a plurality of sectors.

Embodiments of the present invention include providing the apertured mask in the form of a patterned stencil or a photolithographically patterned resist layer.

In accordance with further embodiments of the present invention, the method further comprises the step of:

(d) initializing the servo-patterned magnetic medium by applying a unidirectional, high strength DC magnetic bias field to the magnetic layer to unidirectionally align the magnetization direction of each of the magnetic domains of the ion-implanted and non-implanted areas of the magnetic layer and then adjusting lowering the strength and reversing the direction of the DC magnetic bias field to selectively reverse the magnetization direction of each of the ion-implanted areas of the magnetic layer, for example, by utilizing an externally positioned, variable strength electromagnet or an externally positioned, movable permanent magnet for applying the unidirectional DC magnetic bias field.

Another aspect of the present invention is a servo-patterned magnetic recording medium, comprising:

a magnetic layer having a surface with substantially uniform topography, the magnetic layer including a data zone and a servo pattern, the servo pattern comprising:

(a) a first patterned plurality of regions of first, higher values of magnetic coercivity $H_c$ and magnetic remanence-thickness product Mrt; and (b) a second patterned plurality of implanted regions of second, lower values of $H_c$ and Mrt; wherein the second, lower values of $H_c$ and Mrt are sufficiently lower than the first, higher values of $H_c$ and Mrt for permitting sensing enabling accurate positioning of a read/write transducer head in the data zone but sufficiently high for providing the medium with thermal stability, high amplitude of magnetic transition, and high signal-to-noise ratio.

In accordance with certain exemplary embodiments of the present invention, the first, higher values of $H_c$ and Mrt are in the range from about 6,500 to about 10,000 Oe and in the range from about 0.55 to about 0.60 memu, respectively; and the second, lower values of $H_c$ and Mrt are about 6,000 Oe and about 0.50 memu, respectively. According to other embodiments of the present invention, the first, higher values of $H_c$ and Mrt are about 6,000 Oe and 0.50 memu, respectively; and the second, lower values of $H_c$ and Mrt are about 4,000 Oe and 0.40 memu, respectively.

According to embodiments of the present invention, the servo pattern comprises a plurality of regions extending in a radial direction across the data zone for dividing the data zone into a plurality of sectors; and the data zone includes a plurality of substantially concentric, circumferentially extending data tracks, wherein the servo pattern comprises the regions of second, lower values of $H_c$ and Mrt for denoting the beginning and end of each data track.

In accordance with particular embodiments of the present invention, each of the second patterned plurality of regions of second, lower values of $H_c$ and Mrt comprises a portion of the magnetic layer including implanted nitrogen ions or implanted ions of at least one inert gas element having an atomic weight of at least 35, e.g., argon ions.

Still another aspect of the present invention is a magnetic recording medium comprising:

a magnetic layer having a surface with substantially uniform topography; and means within said magnetic layer for providing a data zone and a servo pattern while affording said medium with thermal stability, high amplitude of magnetic transition, and high signal-to-noise ratio.

Additional advantages and aspects of the present invention will become apparent to those skilled in the art from the following detailed description, wherein embodiments of the invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent aspects and features, wherein.

DESCRIPTION OF THE INVENTION

The present invention addresses and solves problems attendant upon the use of ion implantation through apertured masks for forming servo-patterned magnetic recording media without incurring changes or alterations in surface topography, and is based upon the discovery that an improvement in thermal stability and magnetic performance characteristics and parameters can be obtained by performing the ion implantation for servo patterning on magnetic media selected on the basis of having sufficiently high initial values of magnetic coercivity $H_c$ and magnetic remanence-thickness product Mrt, such that the resulting values of $H_c$ and Mrt of the implanted regions forming the servo pattern are low enough to provide adequate sensing for accurate servo-mechanical positioning of a read/write transducer head forming part of a magnetic-based data/information storage and retrieval system, yet are high enough to afford a requisite or desired degree of media thermal stability, along with desired magnetic performance characteristics/parameters.

Referring now to FIGS. 3(A)–3(B) and 4(A)–4(B), as disclosed in co-pending, commonly assigned U.S. application Ser. No. 09/912,065, filed Jul. 25, 2001, the present inventors determined that implantation of thin-film magnetic recording media with nitrogen ions or inert gas ions of atomic weight of at least 35, e.g., argon ions, under appropriate conditions, can controllably and reproducibly reduce the $H_c$ and Mrt values of the media More specifically, FIGS. 3(A)–3(B) and 4(A)–4(B) indicate that the magnitude of the reduction of both $H_c$ and Mrt is dependent upon the implantation energy and dosage, as well as the ion species, with argon ion implantation providing substantially greater reductions in both $H_c$ and Mrt than those provided with nitrogen ion implantation. For example, implantation of argon ions of 25 KeV energy and 1% dosage result in significant reductions in initial $H_c$ and Mrt values of about 4,000 Oe and 0.40 memu, respectively, to as low as about 200 Oe and about 0.15 memu, respectively. By contrast, implantation of nitrogen ions of 25 KeV energy and 1% dosage results in reductions of $H_c$ and Mrt (from the same initial values) to about 2,000 Oe and 0.30 memu, respectively.

Figure 5:
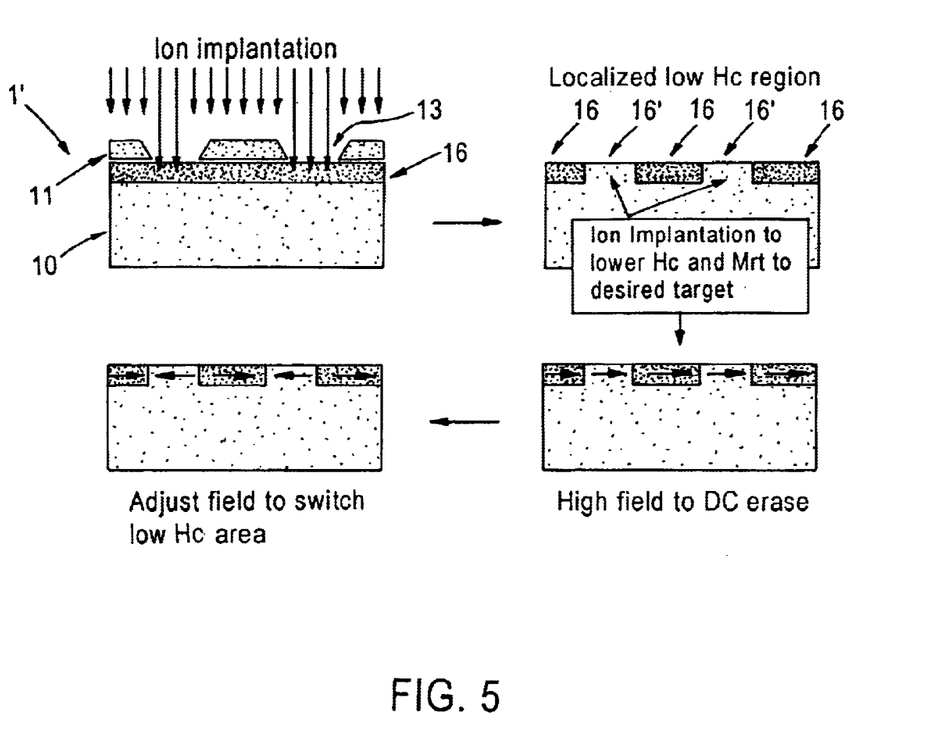
FIG. 5 schematically illustrates, in simplified cross-sectional view, a sequence of steps for forming servo-patterned magnetic recording media according to an embodiment of the present invention.

Adverting to FIG. 5, shown therein in simplified, schematic cross-sectional view, is a sequence of steps for performing servo-patterning of a thin-film magnetic recording medium according to an embodiment of the present invention. Magnetic recording medium 1' is similar to that illustrated in FIG. 1 and includes a non-magnetic substrate 10 including a magnetic recording layer 16 overlying at least one surface thereof, illustratively the upper surface, and optionally, a protective overcoat layer 18 overlying the magnetic recording layer 16, which overcoat layer is not shown in the figure for illustrative simplicity. An apertured mask 11, in the form of a stencil or a photolithographically patterned resist layer, overlies the surface of magnetic recording layer 16 (or the surface of the protective overcoat layer), and includes a pattern of openings 13 extending therethrough, the pattern of openings 13 corresponding to a desired servo pattern to be formed in magnetic recording layer 16. Bombardment of the apertured mask 11 is performed with nitrogen ions or with ions of at least one inert gas having an atomic weight of at least 35, e.g., at least one of argon, krypton, and xenon ions, to form implanted regions 16' in the magnetic recording layer 16 corresponding to the desired servo pattern (and data track pattern according to certain embodiments of the present invention). Suitable ion bombardment conditions for implantation of apertured mask 11 include dosages of from about $1 \times 10^{10}$ to about $9 \times 10^{15}$ ions/cm$^2$ and energies of from about 5 to about 150 KeV. The implantation conditions are selected such that the implanted regions retain sufficient values of relevant magnetic properties, e.g., coercivity $H_c$ and magnetic remanence-thickness product Mrt, such that satisfactory servo sensing can be performed by means of a transducing head, e.g., a flying read/write head.

The inventors have discovered that when the above-described ion implantation process for lowering the values of $H_c$ and Mrt at selected areas of the magnetic layer 16 is performed without regard to the magnitude of the reductions, the implanted areas forming the desired servo pattern may exhibit reduced $H_c$ and Mrt values which are so low as to result in poor thermal stability of the medium, as well as thermal decay of signal amplitude and lower signal amplitudes of the magnetic transition due to lower Mrt values. According to a key feature of the present invention, however, target, or minimum values of $H_c$ and Mrt of the implanted areas for providing acceptable levels or degrees of thermal stability and magnetic performance are established a priori. According to another key feature of the present invention, the target values of $H_c$ and Mrt are obtained by selecting magnetic media having sufficiently high initial $H_c$ and Mrt values such that target values representing an optimum trade-off or compromise between the competing requirements for good servo sensing (i.e., reduced $H_c$ and Mrt) and good thermal stability and magnetic performance (i.e., high $H_c$ and Mrt) can be obtained by ion implantation processing.

By way of illustration, but not limitation, according to the invention, target values of $H_c$ and Mrt of about 6,000 Oe and 0.50 memu, respectively, or in some instances 4,000 Oe and 0.40 memu, respectively, can provide a good balance between the above-described competing objectives of servo sensing and thermal stability. Therefore, inasmuch as the ion implantation techniques according to the invention are capable of controllably and reproducibly lowering initial values of $H_c$ and Mrt by about 2,000 Oe and about 0.10 memu, respectively, according to the present invention, a thin film magnetic medium 1 having initial values $H_c$ and Mrt values of about 6,500–10,000 Oe and 0.55–0.60 memu respectively, or in some instances about 6,000 Oe and 0.50 memu, respectively, is selected for ion implantation, as described supra. In this regard, nitrogen ion implantation at, e.g., dosages of from about $10^{10}$ to about $10^{20}$ ions/cm$^2$ and energies of from about 5 to about 150 KeV may be advantageously utilized in view of the lesser reductions in $H_c$ and Mrt provided by nitrogen ion implantation, compared to argon ion implantation (cf. FIGS. 4(A)–4(B)).

Referring still to FIG. 5, in the next step according to the invention, the apertured mask 11 is then removed from the implanted medium 1, as by any convenient technique, thereby leaving magnetic layer 16 with a pattern of implanted regions 16' of reduced $H_c$ and Mrt values formed therein, wherein the implanted regions 16' have been formed without adversely affecting the surface topography of magnetic layer 16. Stated differently, the topography and other characteristics of the surface of the magnetic layer are constant over its entire extent.

The inventive method thus allows formation of servo patterns in a magnetic recording layer by creating a pattern of lower $H_c$, lower Mrt regions that are capable of being servo sensed to enable accurate positioning of a read/write head in the data zone of the layer, yet the reduced values of $H_c$ and Mrt are not so low as to adversely affect the thermal stability and magnetic performance characteristics of the medium.

According to the next step of the invention, the direction of magnetization of the magnetic domains of the ion-implanted regions forming the servo and/or data tracks is aligned in a direction opposite to that of the magnetic domains of the non-implanted regions forming the data tracks, zones, etc. This is accomplished by magnetically initializing ("erasing") the entire medium (e.g., disk) by applying thereto a unidirectional, high strength DC magnetic bias field sufficient to unidirectionally align the magnetization direction of all of the magnetic domains of the magnetic recording layer 16, irrespective of their $H_c$ and Mrt values, and then, in the final step shown in the figure, adjusting (i.e., lowering) the strength and reversing the direction of the DC magnetic bias field to selectively reverse the magnetization direction of each of the domains of the ion-implanted areas 16' of reduced $H_c$ and Mrt. The DC magnetic bias field may be applied by means of an externally positioned, variable strength, reversible polarity electromagnet or by means of an externally positioned, movable permanent magnet.

Magnetic recording layers 16 including servo patterns comprising the ion-implanted regions 16' having lower values of $H_c$ and Mrt formed according to the invention function for servo positioning of read/write transducer heads by producing different signal intensities at the implanted and non-implanted regions (the implanted regions provide weaker signals than the non-implanted regions), which differences are detected and appropriately processed by an electronic servo controller and head positioning means for precisely and accurately locating the read/write head over a specific data track.

Figure 6:
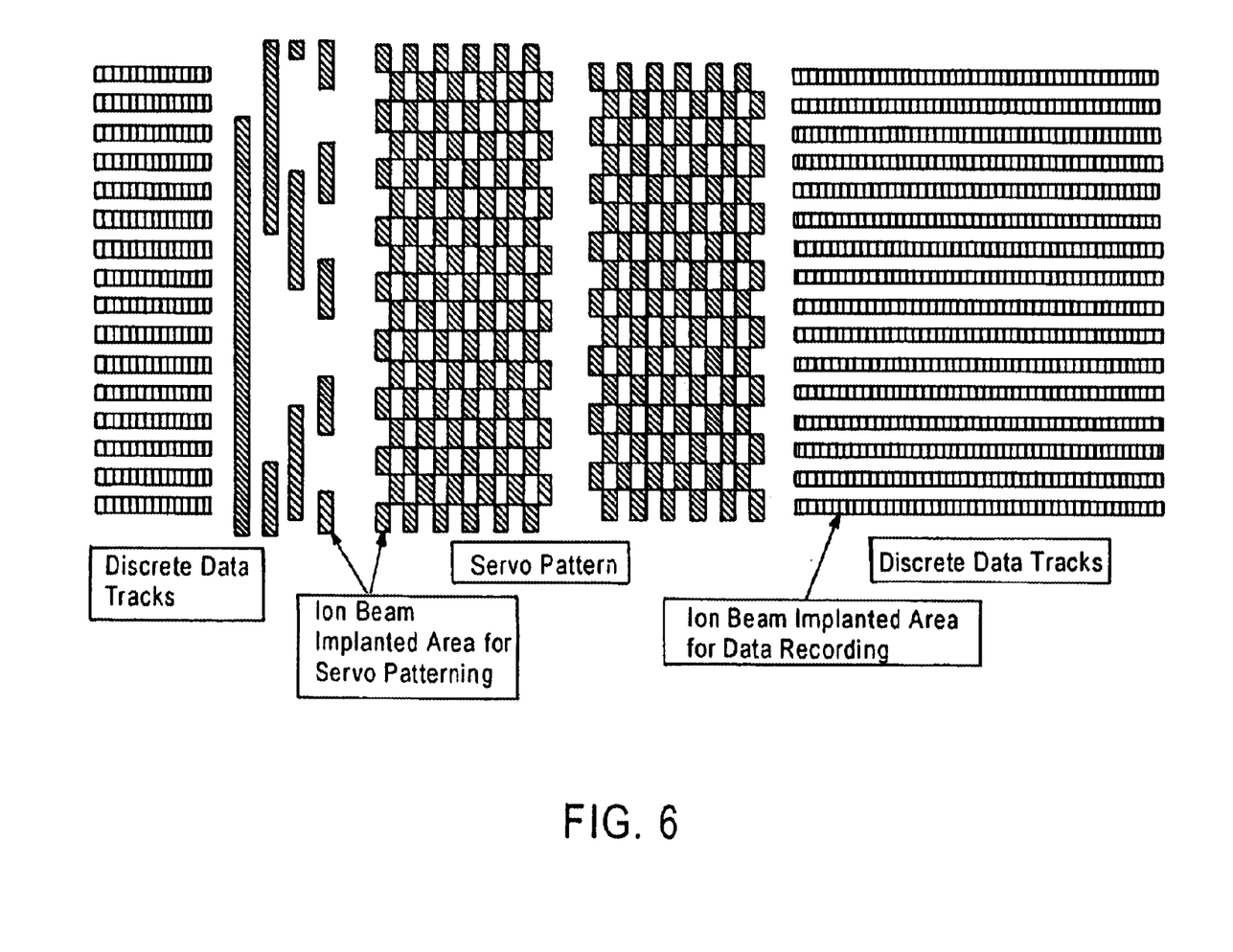
FIG. 6, is a simplified, schematic plan view, of a portion of a surface of a magnetic recording medium formed according to the method of the invention, for illustrating an exemplary servo-pattern.

According to an embodiment of the invention, wherein the medium is disk-shaped, the disk surface includes a data zone and a servo pattern, the servo pattern comprising a first patterned plurality of regions of first, higher values of $H_c$ and Mrt; and a second patterned plurality of implanted regions of second, lower values of $H_c$ and Mrt; wherein the second, lower values of $H_c$ and Mrt are sufficiently lower than the first, higher values of $H_c$ and Mrt for permitting servo sensing enabling accurate positioning of a read/write transducer head in the data zone but sufficiently high for providing the medium with thermal stability, high amplitude of magnetic transition, and high signal-to-noise ratio. The servo pattern may comprise a plurality of regions extending in a radial direction across the data zone for dividing the data zone into a plurality of sectors, the data zone may include a plurality of substantially concentric, circumferentially extending data tracks, and the servo pattern comprises the regions of second, lower values of $H_c$ and Mrt for denoting the beginning and end of each data track. An illustrative, but non-limitative example of a patterned, high $H_c$, high Mrt magnetic recording medium fabricated according to the inventive methodology is shown in simplified, schematic plan view in FIG. 6, illustrating the ion-implanted servo pattern and data tracks.

Thus, the inventive methodology provides for rapid, cost-effective formation of patterned magnetic media, including servo- and data track-patterned thin-film, high $H_c$, high Mrt magnetic recording media, in a manner which advantageously incurs or requires no changes in surface topography of the magnetic layer or medium, and which affords a balance between sensitivity of servo positioning and thermal stability of the medium. Moreover, the inventive methodology is not limited to use with the illustrated disk-shaped media, but rather can be practiced with a variety of different types of magnetic data/information storage and retrieval media.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials, species, and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of making a servo-patterned magnetic recording medium, comprising the sequential steps of:

(a) providing a magnetic recording medium, said medium including a magnetic layer having preselected first, higher values of magnetic coercivity $H_c$ and magnetic remanence-thickness product Mrt;

(b) providing an apertured mask overlying a surface of said magnetic recording medium, said apertured mask including a plurality of servo pattern openings extending therethrough for selectively exposing a plurality of surface areas of said magnetic recording medium corresponding to said servo pattern;

(c) bombarding said apertured mask with ions for implanting said ions into said plurality of exposed surface areas of said magnetic recording medium for selectively reducing said first, higher values of $H_c$ and Mrt of said magnetic layer at said exposed surface areas to preselected second, lower values of $H_c$ and Mrt; wherein:

step (a) comprises providing a magnetic recording medium including a magnetic layer having sufficiently high first values of $H_c$ and Mrt such that step (c) provides each of said plurality of exposed, ion-implanted surface areas of said magnetic layer with second, lower values of $H_c$ and Mrt which are sufficiently lower than said first, higher values of $H_c$ and Mrt for functioning as servo pattern-defining areas, but sufficiently high for providing said medium with thermal stability, high amplitude of magnetic transition, and high signal-to-noise ratio, and step (a) comprises providing a magnetic recording medium wherein said preselected first, higher values of $H_c$ and Mrt are in the range from about 6,500 to about 10,000 Oe and in the range from about 0.55 to about 0.60 memu, respectively; and step (c) comprises bombarding said apertured mask to form ion-implanted areas of said magnetic layer having preselected, second, lower values of $H_c$ and Mrt of about 6,000 Oe and about 0.50 memu, respectively; or step (a) comprises providing a magnetic recording medium wherein said preselected first, higher values of $H_c$ and Mrt are about 6,000 Oe and 0.50 memu, respectively; and step (c) comprises forming ion implanted areas having preselected, second, lower values of $H_c$ and Mrt of about 4,000 Oe and 0.40 memu, respectively.

2. The method according to claim 1, further comprising:

(d) initializing said servo-patterned magnetic medium by applying a unidirectional, high strength DC magnetic bias field to said magnetic layer to unidirectionally align the magnetization direction of each of the magnetic domains of the ion-implanted and non-implanted areas of said magnetic layer and then lowering the strength and reversing the direction of said DC magnetic bias field to selectively reverse the magnetization direction of each of said ion-implanted areas of said magnetic layer.

3. The method according to claim 2, wherein:

step (d) comprises utilizing an externally positioned, variable strength, reversible polarity electromagnet for applying said unidirectional DC magnetic bias field.

4. The method according to claim 2, wherein:

step (d) comprises utilizing an externally positioned, reversible polarity movable permanent magnet for applying said unidirectional DC magnetic bias field.

5. The method according to claim 1, wherein:

step (c) comprises bombarding said apertured mask with ions selected from the group consisting of nitrogen ions and ions of at least one rare gas element having an atomic weight of at least 35.

6. The method according to claim 5, wherein:

step (c) comprises bombarding said apertured mask with nitrogen or argon ions.

7. The method according to claim 6, wherein:

step (c) comprises bombarding said apertured mask with said nitrogen or argon ions at a dosage of from about $1 \times 10^{10}$ to about $1 \times 10^{20}$ ions/cm$^2$ and an energy of from about 5 to about 150 KeV.

8. The method according to claim 5, wherein:

step (c) comprises bombarding said apertured mask with said ions at a dosage of from about $1 \times 10^{10}$ to about $1 \times 10^{20}$ ions/cm$^2$ and an energy of from about 5 to about 150 KeV.

9. The method according to claim 1, wherein:

step (b) comprises providing a said apertured mask including a plurality of openings for providing said magnetic layer with a data zone and a servo pattern comprising a plurality of higher $H_c$, higher Mrt regions and a plurality of lower $H_c$, lower Mrt regions.

10. The method according to claim 9, wherein:

step (b) comprises providing said apertured mask in the form of a patterned stencil or a photolithographically patterned resist layer.

11. The method according to claim 9, wherein:

step (b) comprises providing a servo pattern including a plurality of regions extending in a radial direction across said data zone to divide the latter into a plurality of sectors.

* * * * *